(12) United States Patent
Vilrokx

(10) Patent No.: US 8,315,927 B2
(45) Date of Patent: Nov. 20, 2012

(54) SIMULATING THE EFFECTS OF PROPOSED RULE CHANGES ON CALCULATED LABOR TIME

(75) Inventor: Mark Vilrokx, San Mateo, CA (US)

(73) Assignee: Oracle International Corporation, Redwood Shores, CA (US)

( * ) Notice: Subject to any disclaimer, the term of this patent is extended or adjusted under 35 U.S.C. 154(b) by 521 days.

(21) Appl. No.: 12/204,159

(22) Filed: Sep. 4, 2008

(65) Prior Publication Data

US 2010/0057597 A1    Mar. 4, 2010

(51) Int. Cl.
*G07C 1/10* (2006.01)
*G06F 15/173* (2006.01)

(52) U.S. Cl. .......................................... 705/32; 709/223

(58) Field of Classification Search ...................... 705/32
See application file for complete search history.

(56) References Cited

U.S. PATENT DOCUMENTS

| | | | |
|---|---|---|---|
| 7,213,064 B2 * | 5/2007 | Smith et al. | 709/223 |
| 7,367,491 B2 * | 5/2008 | Cheng et al. | 235/376 |
| 7,383,225 B2 * | 6/2008 | Hallihan | 705/40 |
| 7,809,792 B2 * | 10/2010 | Hirata et al. | 709/205 |
| 2008/0091466 A1 * | 4/2008 | Butler et al. | 705/2 |

OTHER PUBLICATIONS

"Quantifying the Effects of Interference Through Use of an Alternative Method of Productivity Estimation" By Jaehyun Choi, 2006.*

* cited by examiner

*Primary Examiner* — Garcia Ade
(74) *Attorney, Agent, or Firm* — Squire Sanders (US) LLP

(57) ABSTRACT

Systems and methods are described herein for managing labor time information. With respect to one implementation, among others, a labor time management system includes a time data storage device configured to store labor time. The labor time is related to the working time that one or more employees worked over a certain time period. The system also includes a time calculation rules engine and a rule set module. Furthermore, the system includes a simulation system configured to extract at least a portion of the labor time from the time data storage device and apply a proposed rule set on the extracted labor time.

13 Claims, 4 Drawing Sheets

US 8,315,927 B2

SIMULATING THE EFFECTS OF PROPOSED RULE CHANGES ON CALCULATED LABOR TIME

TECHNICAL FIELD

The embodiments of the present disclosure generally relate to managing labor time and more particularly relate to simulating labor time based on proposed time calculation rules.

BACKGROUND

Employers can offer various types of salary or pay plans for their employees. Some employees can work within a structure that pays a set salary. In other situations, some employees can work under a hourly basis. Within these various wage structures, some additional rules may be in effect. For example, some employers offer paid overtime when an employee works more than a certain number of hours per day or a certain number of hours per week. Another rule that may apply is allowing a grace period with respect to a set starting time or ending time as well as establishing or adjusting the length of the grace period. In this case, if an employee arrives within a certain number of minutes before or after a set starting time, then that employee is considered to have started at the starting time, which can simplify the calculation of hours worked. Another rule that may apply is the use of rounding time to the nearest 15 minute increment or other increment.

In many work situations, employees are required to "clock in" at the start of a work shift and "clock out" at the end of the shift. In some situations, a mechanical stamping machine can be used to mark the respective times on a time card. And in other cases, the times can be written or typed on a time card. A company's time and labor administrators typically use these time cards to enter time data into a system to record the number of hours worked by the employees. When entering time, they can also apply any applicable rules to the time entries on the time cards to separate regular time from overtime, to apply grace period rules, to round off time to the nearest increment, and/or other rules. In this type of system, both the raw time entered on the time card and the time calculated as a result of the company's applicable rules can be stored electronically or in a paper filing system.

FIG. 1 is a diagram illustrating a conventional time data repository 10 for storing labor time information. Time data repository 10 may include any suitable mechanical and/or electrical storage system. In FIG. 1, time data repository 10 includes a raw time module 12 for storing raw time and a calculated time module 14 for storing time that is calculated as a result of the company's applicable labor time rules. The information in raw time module 12 and calculated time module 14 can be compared if necessary to resolve any inconsistencies. Normally, raw time information represents starting times of each employee for each day and the ending times for the respective employee. The raw time information can also represent the number of hours that each employee works for each day. This raw time information is entered and stored in raw time module 12. Depending on the company's applicable rules, an administrator can use the raw time information to determine calculated time, which is entered and stored in calculated time module 14.

SUMMARY

The embodiments of present disclosure describe systems and methods for managing labor time information. With respect to one of several embodiments, a labor time management system includes a time data storage device configured to store labor time, which relates to the time that one or more employees worked over a certain time period. The system also includes a time calculation rules engine and a rule set module. Furthermore, the system includes a simulation system configured to extract at least a portion of the labor time from the time data storage device and apply a proposed rule set on the extracted labor time.

Other features, advantages, and implementations of the present disclosure, not expressly disclosed herein, will be apparent to one of ordinary skill in the art upon examination of the following detailed description and accompanying drawings. It is intended that such implied implementations of the present disclosure be included herein.

BRIEF DESCRIPTION OF THE DRAWINGS

The components of the following figures are illustrated to emphasize the general principles of the present disclosure. Reference characters designating corresponding components are repeated as necessary throughout the figures for the sake of consistency and clarity.

DETAILED DESCRIPTION

Figure 1:
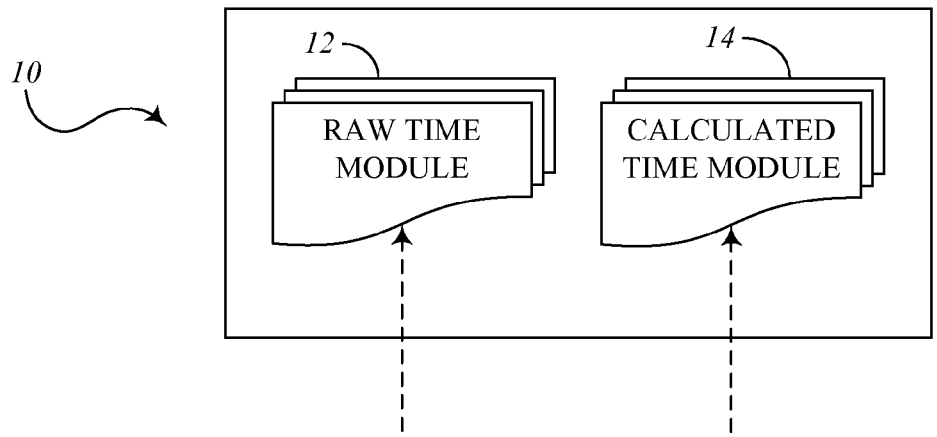
FIG. 1 is a diagram illustrating a conventional time data repository for recording labor time.

The embodiments of the present disclosure describe systems and methods for managing time entries related to the labor time of a number of employees. The embodiments herein are capable of taking the simple time entries, referred to herein as "raw time," and applying certain rules to the raw time to calculate new time data, referred to herein as "calculated time." The calculated time in these embodiments is determined automatically based on the various rules that are in effect.

In addition to calculating the calculated time, a number of embodiments described herein are further capable of simulating the effect on the calculated time if certain proposed rules were applied. By extracting the actual raw time, the present systems can use this data under a different rule set that is being proposed to determine how the proposed rule set impacts the results. From the proposed rule set, proposed calculated time is calculated and is compared with the actual calculated time under the existing rule set. From this comparison, it can be determined how the proposed rule set would effect the payroll, how it would effect customer billing, and other factors of a company.

For example, if a company plans to begin offering paid overtime to its employees, then proposed overtime rules can be applied to the previously entered raw time to determine how the new rules would affect the company's payroll. In this way, the executives or administrators of the company can determine how certain rule changes might affect pay. Applying the principles of the teaching herein, a company can better predict how proposed rule changes regarding time and labor might affect the company's labor and financial bottom line and whether the proposed changes would meet the company's needs and goals.

A company may have a number of existing time and labor rules in effect. However, it might be difficult to predict the outcome of changing one or more rules, since one rule may affect another. Since all the time and labor rules are interdependent, the impact of any change, however small it might be, would be difficult to anticipate. The embodiments herein are capable of predicting the impact of proposed rule changes.

Currently, federal and state laws require that overtime should be paid under certain conditions. Federal law dictates that overtime should be paid for labor time over 40 hours per week and in some states the law dictates that overtime should be paid for labor time over 8 hours per day. In addition, other existing laws require that employees should be paid double time for working more than a certain number of hours in a day, e.g., 12 hours. As an example, if a union requests a certain rule change, e.g., lowering the overtime threshold from 40 hours per week to 39 hours per week, the embodiments herein can accurately predict how such changes would affect the company's payroll and labor. Also, this tool can be used with regard to bargaining discussions to determine the possible effect of these changes. In some cases, a company may be able to run various scenarios of different rule sets in order to attempt to compensate for the effect of one new rule by proposing one or more additional rules as well.

Figure 2:
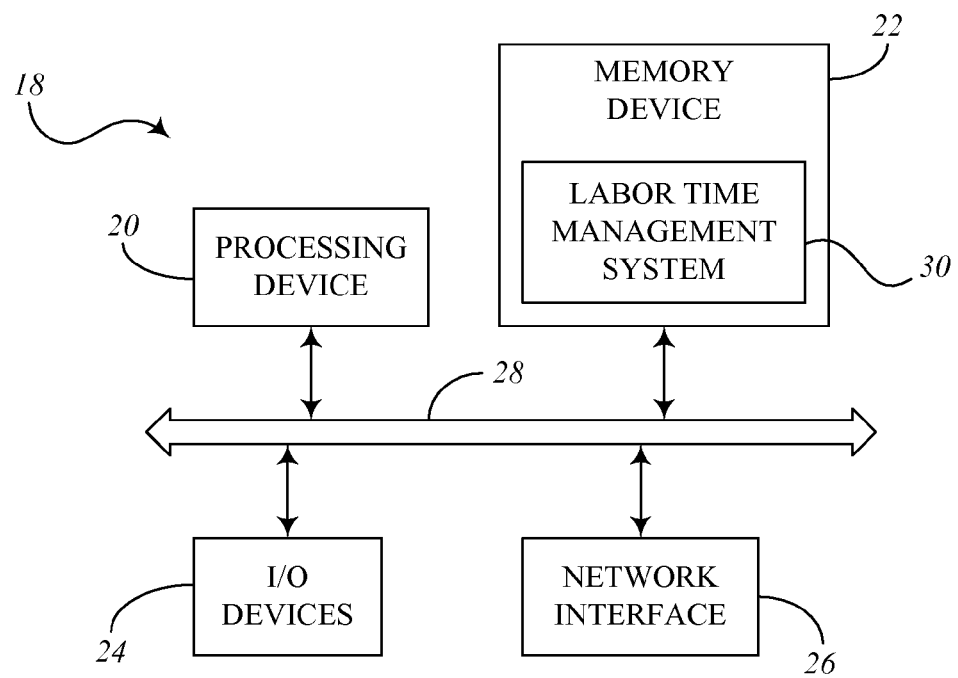
FIG. 2 is a block diagram illustrating a computer system for managing labor time, according to one embodiment.

FIG. 2 is a block diagram of an embodiment of a computer system 18 for managing time data related to employee labor. In some embodiments, computer system 18 is capable of simulating a calculation of time information and pay based on the effects of proposed rule sets. Hence, computer system 18 can compare the simulated results to the actual results of time calculation for the rules that are already in place. In this embodiment, computer system 18 includes a processing device 20, memory device 22, input/output (I/O) devices 24, and network interface 26, each interconnected via a bus 28. In the embodiment of FIG. 2, memory device 22 includes a labor time management system 30 for managing labor time information associated with employees' working hours for a company.

Processing device 20 may be a general-purpose or specific-purpose processor or microcontroller. Memory device 22 may include one or more internally fixed storage units, removable storage units, and/or remotely accessible storage units. The storage units can be configured to store information, data, instructions, and/or software code. The storage units may include any suitable combination of volatile memory and/or non-volatile memory.

Memory device 22 is configured to store program code that enables processing device 20 to execute labor time management procedures. Various logical instructions or commands may be included in the program code for managing labor time. The embodiments of labor time management systems and programs described in the present disclosure can be implemented in hardware, software, firmware, or a combination thereof. When implemented in software or firmware, as illustrated in FIG. 2, labor time management system 30 can be stored in memory device 22 and executed by processing device 20. In other embodiments, labor time management systems or modules can be implemented in hardware in processing device 20 using discrete logic circuitry, an application specific integrated circuit (ASIC), a programmable gate array (PGA), a field programmable gate array (FPGA), other suitable logic circuit, or any combination thereof.

Labor time management systems and modules, which can be stored partially or fully in memory device 22, and any other software, programs, or computer code including executable logical instructions as described herein, can be embodied in computer-readable media for execution by any suitable processing device. The computer-readable media as described herein can include one or more suitable physical media components that can store the software, programs, or computer code for a measurable length of time.

I/O devices 24 may include input mechanisms such as keyboards, keypads, cursor control devices, or other data entry devices. The input mechanisms may be used for entering information in memory device 22. For example, input mechanisms may allow a user to enter the work time, such as start times and end times, of employees of a company. The input mechanisms may also be used to enter or select proposed new rules, to target certain employees or certain time entries, to enter anticipated or predicted changes in the number of employees available to work or changes in employee work patterns, etc. I/O devices 34 also include output devices, which may include, for example, computer monitors, audio output devices, printers, or other peripheral devices.

Computer system 18 can be configured from multiple devices in multiple locations and, in some implementations, may be connected to or associated with an enterprise resource planning ("ERP") system of a specific company. In this respect, network interface 26 is capable of interfacing with one or more networks associated with a company to access data from the networks. Particularly, network interface 26 can access employee information, labor information, payroll information, etc.

Figure 3:
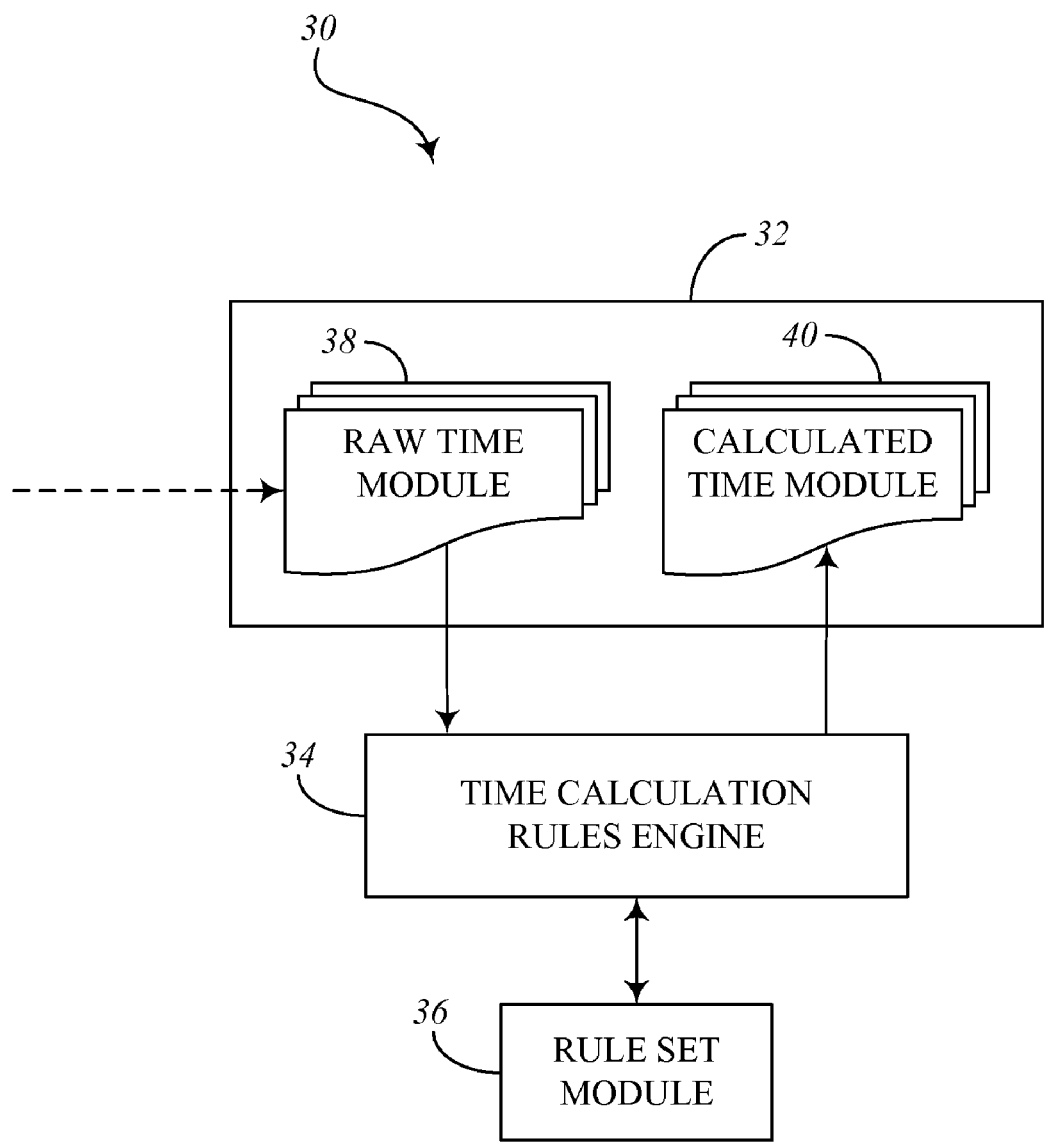
FIG. 3 is a block diagram illustrating the labor time management system shown in FIG. 2, according to a first embodiment.
Figure 4:
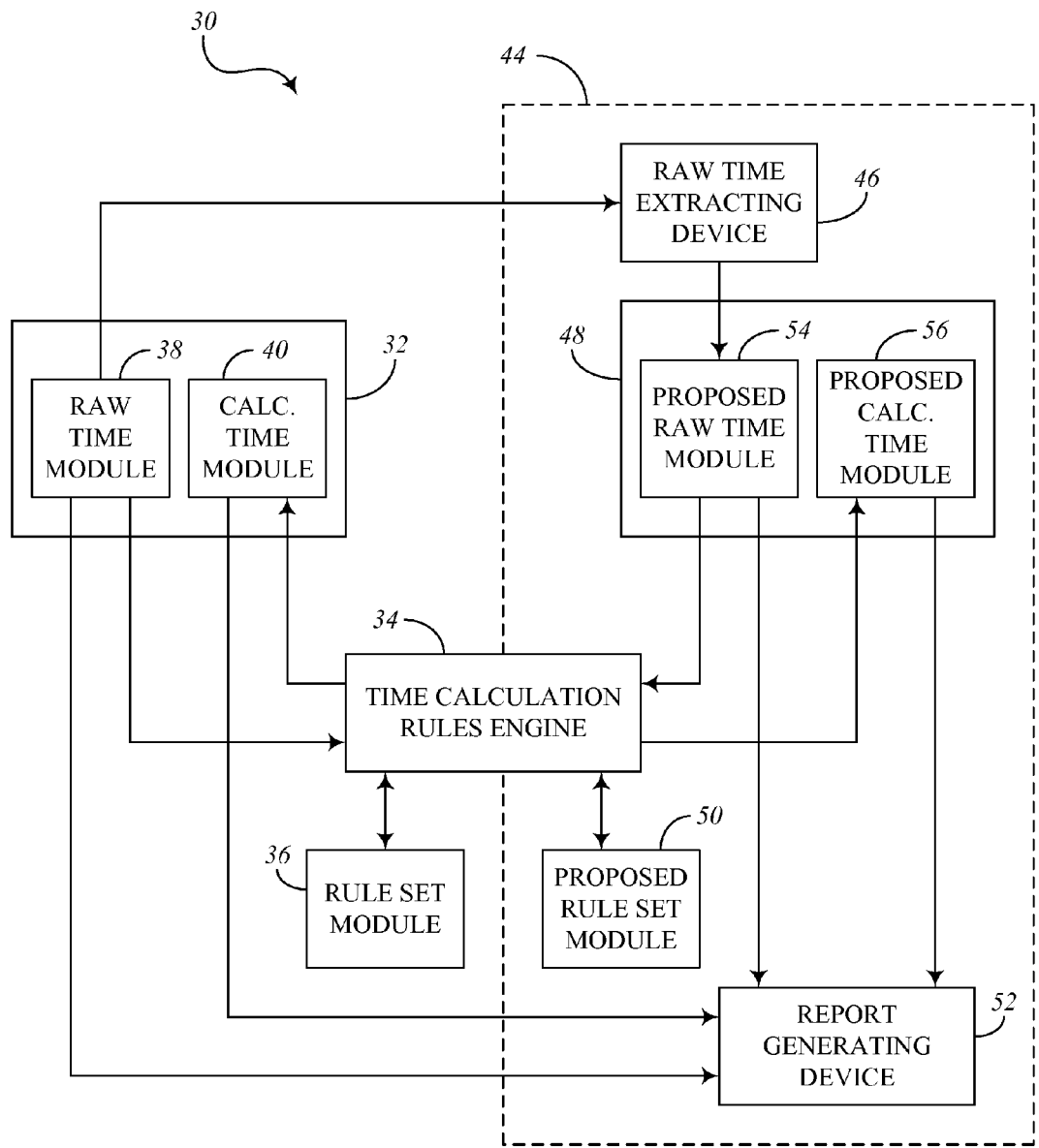
FIG. 4 is a block diagram illustrating the labor time management system shown in FIG. 2, according to a second embodiment.

Labor time management system 30 is capable of managing work time or labor time for employees of a company, as is described in greater detail with respect to FIGS. 3 and 4. Raw time, which is representative of the time that one or more employee works, can be entered into storage associated with labor time management system 30 using, for example, I/O devices 24. From the raw time, labor time management system 30 can calculate time based on a number of time and labor rules in effect. A non-limiting list of example rules includes regular hours per day, regular hours per week, overtime hours beyond the regular hours, overtime pay, grace period for starting times, grace period for ending times, rounding time to a nearest increment, etc.

FIG. 3 is a block diagram showing a first embodiment of labor time management system 30 shown in FIG. 2. In this embodiment, labor time management system 30 includes a time data storage device 32, a time calculation rules engine 34, and a rule set module 36. Time data storage device 32 includes a raw time module 38 and a calculated time module 40. Raw time module 38 stores labor time that is entered directly, either by entering starting times and ending times or by entering a number of working hours per day. The raw time may correspond, for example, to timecards that are submitted by the employees.

With regard to the general operation of the first embodiment of labor time management system 30 shown in FIG. 3, rule set module 36 enables a user to select and/or create rules with respect to how labor time is handled. After this is established, the raw time stored in raw time module 38 is applied to time calculation rules engine 34. Time calculation rules engine 34 accesses rule set module 36 to determine the rules for handling the labor time. Using these rules, time calculation rules engine 34 manipulates and calculates the raw time accordingly and stores the new calculated time in calculated time module 40. Thus, both the raw time and calculated time can be stored in time data storage device 32. Time calculation rules engine 34 is able to automatically calculate the time according to the applicable rule set residing in rule set module 36. By allowing time calculation rules engine 34 to automatically calculate the calculated time to be stored in calculated time module 40, a large amount of time for the administrators in the company can be saved.

FIG. 4 is a block diagram illustrating a second embodiment of labor time management system 30 shown in FIG. 2. In this embodiment, labor time management system 30 includes time data storage device 32, time calculation rules engine 34, and rule set module 36, which are the same or similar components compared to the embodiment shown with respect to FIG. 3. However, in this embodiment, labor time management system 30 further includes a simulation system 44. Simulation system 44 includes a raw time extracting device 46, a second time data storage device 48, a proposed rule set module 50, and a report generating device 52. In this embodiment, the second time data storage device 48 includes a proposed raw time module 54 and a proposed calculated time module 56.

When the administrators of a company wish to simulate the effect of changes to the rules, they can select or define a proposed rule set and store this rule set in proposed rule set module 50. In some embodiments, rules set module 36 and proposed rule set module 50 may be combined into one module and may include tables having the existing rule set and proposed rule set. In this case, the rules for the existing set and/or proposed set may be identified by a flag or other indication to keep the rule sets separated. Rules for the existing or proposed sets can be selected using a user interface as will be understood by one of ordinary skill in the art.

Various labor time rules can be entered, selected, created, edit, etc. For example, overtime rules may be based on a threshold of work hours per day, per week, per bi-week, or for any desirable time period as the user chooses. Also, the threshold amount of hours can be changed or set as well. For example, proposed rule set module 50 can allow a user to set a threshold of, say, 37.5 hours per week, where any number of hours over 37.5 are considered overtime. Using proposed rule set module 50, the user can make certain exceptions, such as not allowing overtime on the Wednesday before Thanksgiving, or others. Other rules, such as rounding to the nearest 15 minutes, 10 minutes, 6 minutes, or other time, can be entered. Another rule may be related to grace periods before or after certain specific beginning or ending times, particularly for businesses that have certain store hours, set operating hours, etc. In addition to the rules and associated thresholds or parameters, the order or sequence that the rules are applied is also entered by the user, which can have an impact on the outcome.

Before, during, or after the proposed rules are entered, the user can use raw time extracting device 46 to extract the raw time from raw time module 38 to be copied and placed in proposed raw time module 54. It should be understood that any or all of raw time module 38, calculated time module 40, proposed raw time module 54, and proposed calculated time module 56 can be incorporated together and separated by any suitable addressing mechanism.

The extraction process of raw time extracting device 46 may involve selecting the time data of a group of employees that the user wishes to extract. For example, if a rule is being applied or proposed for only one or more certain groups of employees, e.g., welders, U.S. workers, non-exempt employees, etc., then only the raw time for these particular group or groups is extracted. The user can also make changes to the raw time that is extracted based on anticipated changes in the company, e.g., change in the number of employees, change in the number or types of positions in the company, etc. The user can also modify the raw time based on predictions of changes in the work patterns of the employees, e.g., working longer hours to receive paid overtime, working longer or shorter hours based on anticipated work demand, etc. In some embodiments, the prediction of changes in work patterns can be entered by percentages. For example, it might predicted that workers would work about 5-10% longer hours to receive paid overtime if overtime were offered. The user can also select a period of time during which raw time was entered. For example, the user may wish to extract only the raw time from the past month, quarter, year, or other time frame. Also, the user can select to give more weight to more recent time entries than older time.

Finally, the extracted raw time, which may have been manipulated by the user, is stored in proposed raw time module 54. In some implementations, the extracted time, if not changed, can simply be flagged or marked accordingly within time data storage device 32 to identify the data that is to be used in the simulation processes of simulation system 44.

When proposed raw time module 54 includes the extracted time data, this data is submitted to time calculation rules engine 34. In some embodiments, time calculation rules engine 34 is the same engine used for calculating the calculated time for the existing rule set stored in rule set module 36, as illustrated. In this regard, time calculation rules engine 34 is designed to properly calculate the calculated time to be stored in calculated time module 40 based on rules applied from rule set module 36, while separately calculating the proposed calculated time to be stored in proposed calculated time module 56 according to rules of the proposed rule set stored in proposed rule set module 50. In other embodiments, time calculation rules engine 34 can be divided into two engines, one dedicated to calculating time according to the existing rules and one dedicated to the simulation system 44 for calculating time according to the proposed rules.

Using the proposed raw time from proposed raw time module 54, time calculation rules engine 34 queries the proposed rules stored in proposed rule set module 50. Time calculation rules engine 34 then applies the proposed rules to the proposed raw time to determine or calculate the results of the new rules. The results, or calculated time, are stored in proposed calculated time module 56 of the second time data storage device 48.

Once the new rules are applied to the extracted raw time and a simulation is made to see how the calculated time is effected by the new rules, then a report can be generated to indicate to the user the effects of the new proposed rules. Specifically, time information from each of raw time module 38, calculated time module 40, proposed raw time module 54, and proposed calculated time module 56 is provided to report generating device 52. Also, information related to the extraction process of raw time extracting device 46 can be applied to report generating device 52 for inclusion in the report. Report generating device 52 compares the actual calculated time with the proposed calculated time and indicates any differences in the report to be presented to the user.

The report can include any information as needed by the user. Report generating device 52 can be configurable to present the comparison information in any manner. In some embodiments, the user can change how report generating device 52 presents the information and what information is presented. Also, report generating device 52 may operate in association with I/O devices 24 (FIG. 2) to output the information to the user. In this respect, the respective output device may be a computer monitor for displaying information on the screen of the monitor showing the relevant information, a printer for printing the report on paper, or other suitable output device.

Based on the comparison report, the user is equipped to more intelligently make a decision about whether or not the proposed rules should be put in place for the company. Also, the user can enter other rules or change the proposed rules to create a new proposed rule set and the simulation can be run again. In this way, the user can see how a number of different proposed rules or rule sets will affect the company's payroll and labor. By simulating these types of proposed rules, the rules can be fine tuned to more directly focus on the company's goals and anticipated changes. Labor time management system 30 of FIG. 4 can be used as a tool to predict the effect of proposed rule changes. The user can then prepare a further report with the results of labor time management system 30 and submit the report to executives of the company to inform them of the proposed rules and the anticipated effects that the proposed rules may have on the company's operating expenses and margins for the future.

The following is an example of labor time information and calculated time associated with operation of labor time management system 30. Suppose that an employee submits a timecard that includes the following raw time information:

|  | Mon | Tues | Wed | Thurs | Fri | Total |
|---|---|---|---|---|---|---|
| Clock In | 8:50 | 8:59 | 8:56 | 8:54 | 8:53 |  |
| Clock Out | 17:02 | 17:00 | 17:09 | 17:02 | 17:06 |  |
| Totals | 8:12 | 8:01 | 8:13 | 8:08 | 8:13 | 40:47 |

Also, suppose that the respective company wishes to introduce a new rule that pays employees overtime for work over 40 hours in a week. By running simulation system 44, the following information would be calculated by time calculation rules engine 34 using the new overtime rule:

|  | Mon | Tues | Wed | Thurs | Fri | Total |
|---|---|---|---|---|---|---|
| Clock In | 8:50 | 8:59 | 8:56 | 8:54 | 8:53 |  |
| Clock Out | 17:02 | 17:00 | 17:09 | 17:02 | 17:06 |  |
| Totals | 8:12 | 8:01 | 8:13 | 8:08 | 8:13 | 40:47 |
| Regular | 8:12 | 8:01 | 8:13 | 8:08 | 7:26 | 40:00 |
| Overtime |  |  |  |  | 0:47 | 0:47 |

In this example, report generating device 52 can present a comparison report indicating that 0:47 less Regular time is paid, but 0:47 more Overtime is paid. Using the rate that Overtime is paid at, the effect of the proposed rule on operating expenses can be determined and presented to the user.

Suppose that another rule set is proposed in which a grace period of 10 minutes before or after a given starting time of 9:00 is applied first, a grace period of 10 minutes before or after a given ending time of 17:00 is applied second, and overtime over 40 hours in a week is applied third. Using the same raw data from above, the calculated time information would be:

|  | Mon | Tues | Wed | Thurs | Fri | Total |
|---|---|---|---|---|---|---|
| Clock In | 9:00 | 9:00 | 9:00 | 9:00 | 9:00 |  |
| Clock Out | 17:00 | 17:00 | 17:00 | 17:00 | 17:00 |  |
| Totals | 8:00 | 8:00 | 8:00 | 8:00 | 8:00 | 40:00 |
| Regular | 8:00 | 8:00 | 8:00 | 8:00 | 8:00 | 40:00 |
| Overtime |  |  |  |  |  | 0:00 |

Report generating device 52 can provide comparisons in this case as well, indicating that no overtime is paid, which is the same as the original scenario when no overtime was offered. However, 0:47 less Regular time is paid in this example. The combination of grace periods and overtime in this case would actually be more beneficial to the company than when no grace period and no overtime were offered.

Suppose the following timecard is submitted for another employee:

|  | Mon | Tues | Wed | Thurs | Fri | Total |
|---|---|---|---|---|---|---|
| Clock In | 9:10 | 9:02 | 9:00 | 9:05 | 9:02 |  |
| Clock Out | 16:57 | 16:59 | 16:56 | 16:52 | 16:51 |  |
| Totals | 7:47 | 7:57 | 7:56 | 7:47 | 7:49 | 39:16 |

Suppose the company wishes to find out how the proposed grace period rules and overtime rules, as mentioned above, would affect the labor time for this employee. The following shows the calculated time for the proposed rule set:

|  | Mon | Tues | Wed | Thurs | Fri | Total |
|---|---|---|---|---|---|---|
| Clock In | 9:00 | 9:00 | 9:00 | 9:00 | 9:00 |  |
| Clock Out | 17:00 | 17:00 | 17:00 | 17:00 | 17:00 |  |
| Totals | 8:00 | 8:00 | 8:00 | 8:00 | 8:00 | 40:00 |
| Regular | 8:00 | 8:00 | 8:00 | 8:00 | 8:00 | 40:00 |
| Overtime |  |  |  |  |  | 0:00 |

In this example, by simulating the time under the proposed rule set, 0:44 more Regular time would be paid and overtime would remain the same. Therefore, the company will see from the comparison that the proposed rule set in this case is less beneficial to the company than the original scenario.

However, by combining all timecards for these and other employees, a comparison can be made between an existing scenario under an existing rule set and a new scenario under a proposed rule set. From these comparisons, the company can determine whether the proposed rule set might result in more or fewer regular hours and more or fewer overtime hours. Of course, with only a couple timecards, the comparison between the original scenario and the proposed scenario might be easy to calculate, but with a larger sample of timecards and larger sample of rules in all its permutations, labor time management system 30 can quickly provide the company with an accurate prediction of the effects of the proposed rule set on the company's bottom line.

In addition, the company may choose to run the simulation using different rules or different parameters. For example, perhaps a larger grace period before a specific start time and a smaller grace period after the start time could be proposed.

Also, rules could be added or removed from the rule set to propose any possible scenario. Furthermore, not only will the rules themselves affect the outcome, but also the order in which the rules are applied will affect the outcome as well.

Figure 5:
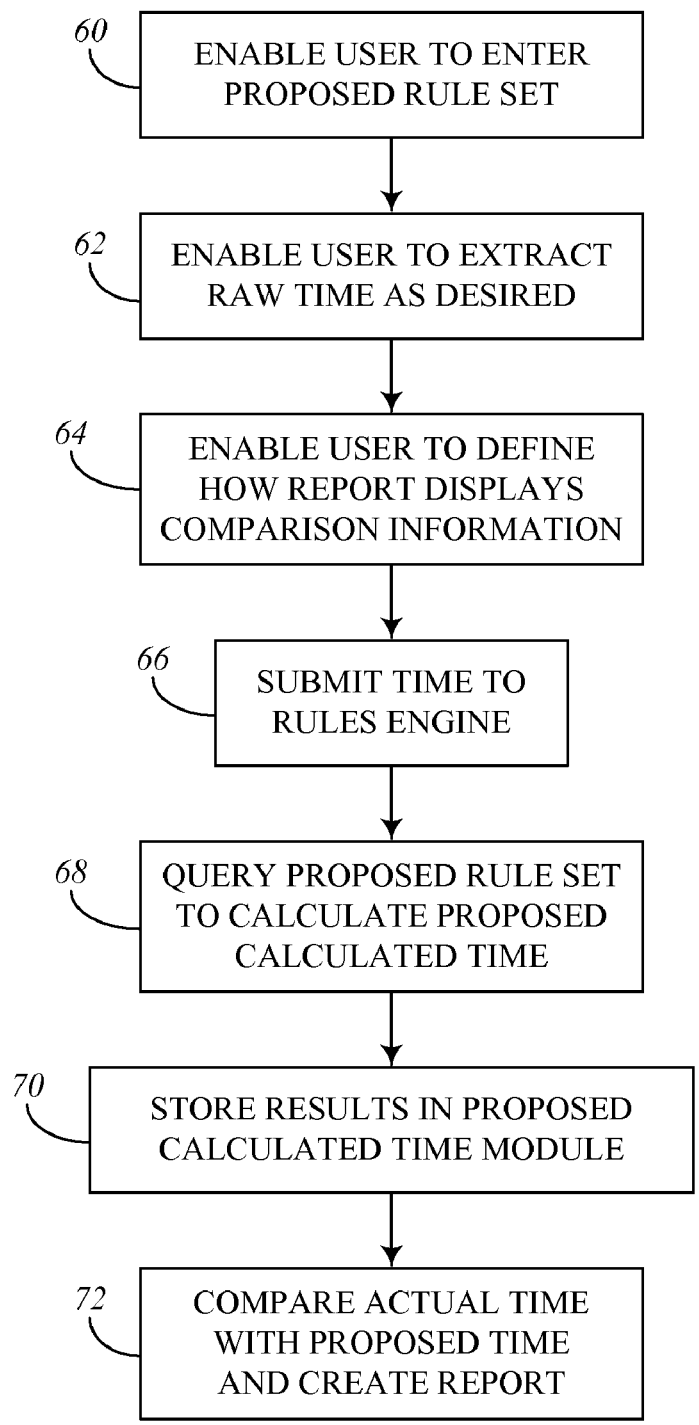
FIG. 5 is a flow diagram illustrating a method of simulating the effects of proposed time calculation rules, according to one embodiment.

FIG. 5 is a flow diagram illustrating an embodiment of a method for simulating the results of proposed new rule sets when applied to existing raw time. As indicated in block 60, a user is enabled to enter the proposed rule set. Entering the proposed rule set may include selecting rules from a prepared table, such as, for example, one shared by the existing rule set. To enter the information, the proposed rule set may be selected, created, modified, etc. according to various design implementations and/or user needs. As indicated in block 62, the user is enabled to extract raw time as needed. The raw time can be extracted to target a select group or groups of employees. Also, the user is enabled to make adjustments to the raw time data as needed according to anticipated changes in the company, predictions of work pattern changes, etc. As indicated in block 64, the user is enabled to define how a report displays comparison information. The comparison information specifically compares the effect of the existing rule set on labor time with the effect of the proposed rule set on the same labor time.

As indicated in block 66, the extracted raw time is submitted to a rules engine to run the proposed rule set on the extracted raw time. As indicated in block 68, the proposed rule set is queried in order to calculate the proposed calculated time. As indicated in block 70, the results of applying the proposed rule set are stored in a proposed calculated time module, which can be part of a time storage device. As indicated in block 72, the actual time is compared with the proposed time. Specifically, the raw time and calculated time can be compared with the proposed raw time and proposed calculated time. From this comparison, a report can be created to estimate or predict the effect of applying the proposed rule set.

It should be understood that the routines, steps, processes, or operations described herein may represent any module or code sequence that can be implemented in software or firmware. In this regard, these modules and code sequences can include commands or instructions for executing the specific logical routines, steps, processes, or operations within physical components. It should further be understood that two or more of the routines, steps, processes, and/or operations described herein may be executed substantially simultaneously or in a different order than explicitly described, as would be understood by one of ordinary skill in the art.

The implementations discussed in the present disclosure provide an accurate prediction or forecast of the effects of rule changes with respect to time and labor. Instead of using hypothetical numbers, the computer system 18 can use actual time entries from past timecards to get an accurate indication of working patterns of a company's employees. Then simulation is performed on a copy of the old time entries to see the effect of proposed new rules. This simulation can give an accurate prediction or forecast of how the proposed rules might affect the company's bottom line in the future if these rules were actually to be put into effect.

The embodiments described herein represent a number of implementations and examples and are not intended to necessarily limit the present disclosure to any specific embodiments. Instead, various modifications can be made to these embodiments as would be understood by one of ordinary skill in the art. Any such modifications are intended to be included within the spirit and scope of the present disclosure and protected by the following claims.

I claim:

1. A system comprising:
a memory device configured to store first time data related to labor time of one or more employees of a company; and
a processing device in communication with the memory device, the processing device configured to execute logic instructions associated with a labor time management system, wherein the logic instructions control the processing device to:
manipulate, using an existing rule set, the first time data to determine a calculated time;
store, in the memory device, a proposed rule set comprising proposed rules for defining how labor time is calculated, wherein the proposed rule set comprises a rule set that has not been applied; and
submit at least a portion of the first time data to an engine configured to calculate a proposed labor time based on the proposed rule set,
wherein the logic instructions further control the processing device to compare the calculated time based on the existing rule set with the proposed labor time based on the proposed rule set, and to determine, based on the comparison between the calculated time and the proposed labor time, how the proposed rule set affects labor and payroll of the company.

2. The system of claim 1, further comprising input/output devices configured to allow communication with a user.

3. The system of claim 1, further comprising a network interface configured to access data associated with time and labor from a network associated with the company.

4. The system of claim 1, wherein the labor time management system is embodied in software that is stored in the memory device.

5. The system of claim 1, wherein the labor time management system is embodied in hardware and incorporated in the processing device.

6. The system of claim 1, wherein the logic instructions further enable the processing device to generate a report based on the comparison.

7. The system of claim 1, wherein the logic instructions further enable the processing device to extract at least a portion of the time data stored in the memory device.

8. The system of claim 7, wherein the logic instructions further enable the processing device to allow a user to modify the extracted time data.

9. A method, comprising:
storing, by a memory device, first time data related to labor time of one or more employees of a company;
using an existing rule set to manipulate the first time data to determine a calculated time;
storing, by a processing device, a proposed rule set comprising proposed rules for defining how labor time is calculated, wherein the proposed rule set comprises a rule set that has not been applied;
submitting, by the processing device, at least a portion of the first time data to an engine configured to calculate a proposed labor time based on the proposed rule set;
comparing, by the processing device, the calculated time based on the existing rule set with the proposed labor time based on the proposed rule set; and
determining, based on the comparison between the calculated time and the proposed labor time, how the proposed rule set affects labor and payroll of the company.

10. The method of claim 9, further comprising generating a report based on the comparison.

11. The method of claim 9, further comprising extracting at least a portion of the time data stored in the memory device.

12. The method of claim 9, further comprising allowing a user to modify the extracted time data.

13. A non-transitory computer readable medium having instructions stored thereon for execution by a processor, the instructions comprising:
- storing first time data related to labor time of one or more employees of a company;
- using an existing rule set to manipulate the first time data to determine a calculated time;
- storing a proposed rule set comprising proposed rules for defining how labor time is calculated, wherein the proposed rule set comprises a rule set that has not been applied;
- submitting at least a portion of the first time data to an engine configured to calculate a proposed labor time based on the proposed rule set;
- comparing the calculated time based on the existing rule set with the proposed labor time based on the proposed rule set; and
- determining, based on the comparison between the calculated time and the proposed labor time, how the proposed rule set affects labor and payroll of the company.

* * * * *